United States Patent

Tischler

[15] 3,687,289
[45] Aug. 29, 1972

[54] WATER SOFTENER SYSTEM
[72] Inventor: Edward J. Tischler, St. Paul, Minn.
[73] Assignee: Ecodyne Corporation
[22] Filed: Sept. 4, 1970
[21] Appl. No.: 69,683

[52] U.S. Cl. ............... 210/89, 73/422 TC, 137/398,
 210/104, 210/105, 210/126, 210/140
[51] Int. Cl. .............................................. B01d 35/00
[58] Field of Search .......... 222/70, 71, 1, 67; 210/30,
 210/35, 269, 138, 89, 101, 104, 105, 126,
 128, 140; 73/422 TC; 137/398, 399

[56] References Cited

UNITED STATES PATENTS 3,048,274  8/1962  Lundeen..................210/101
3,442,136  5/1969  Wilson..................73/422 TC

*Primary Examiner*—Samuel F. Coleman
*Assistant Examiner*—Francis J. Bartuska
*Attorney*—Charles M. Kaplan and Joel E. Siegel

[57] ABSTRACT

A water softener system including a metering device associated with the soft water line to meter a predetermined proportion of water from the soft water line. This water is directed to a chamber having an adjustable water storage capacity. The proportion of water metered from the soft water line is directly proportional to the storage capacity of the chamber. The water stored in the chamber is periodically directed to the brine storage tank. A timer actuating means is provided to actuate the timer when the liquid level in the brine tank reaches a predetermined level. A float valve is provided to prevent brine from being withdrawn below a predetermined low level in the tank.

7 Claims, 9 Drawing Figures

INVENTOR.
Edward J. Tischler
BY Joel E. Siegel
Attorney.

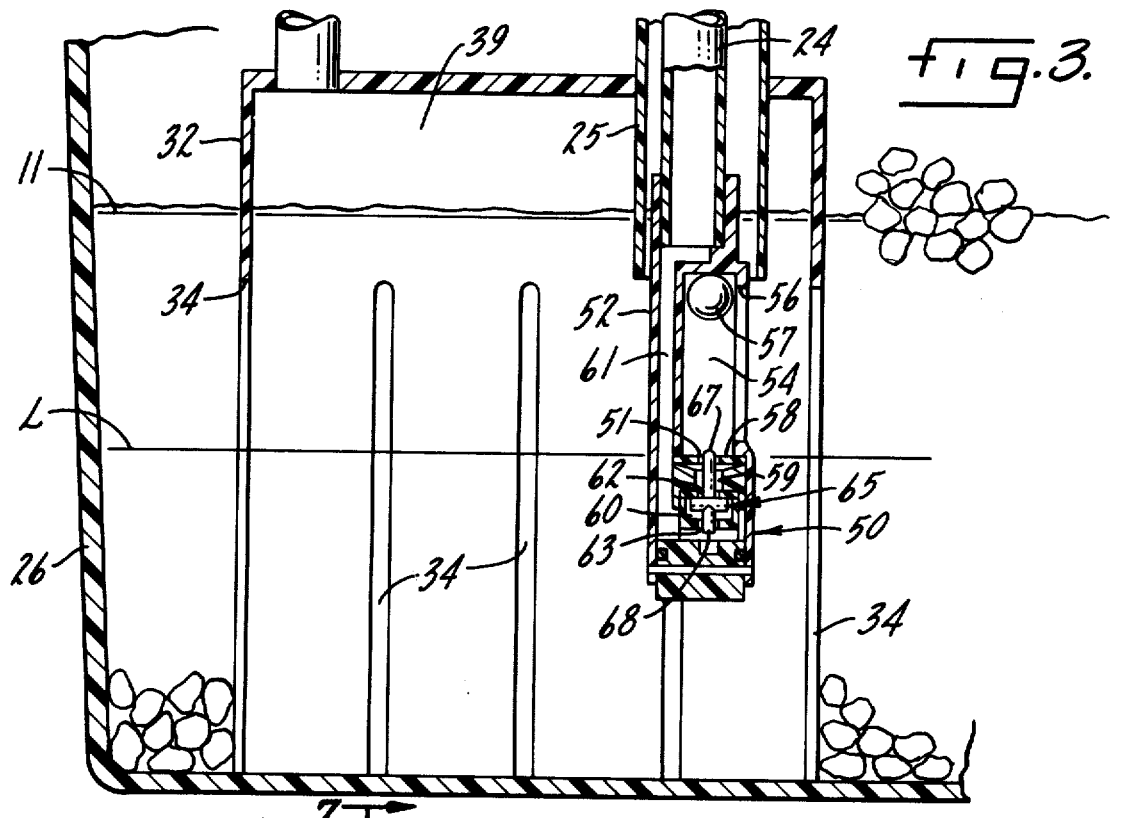

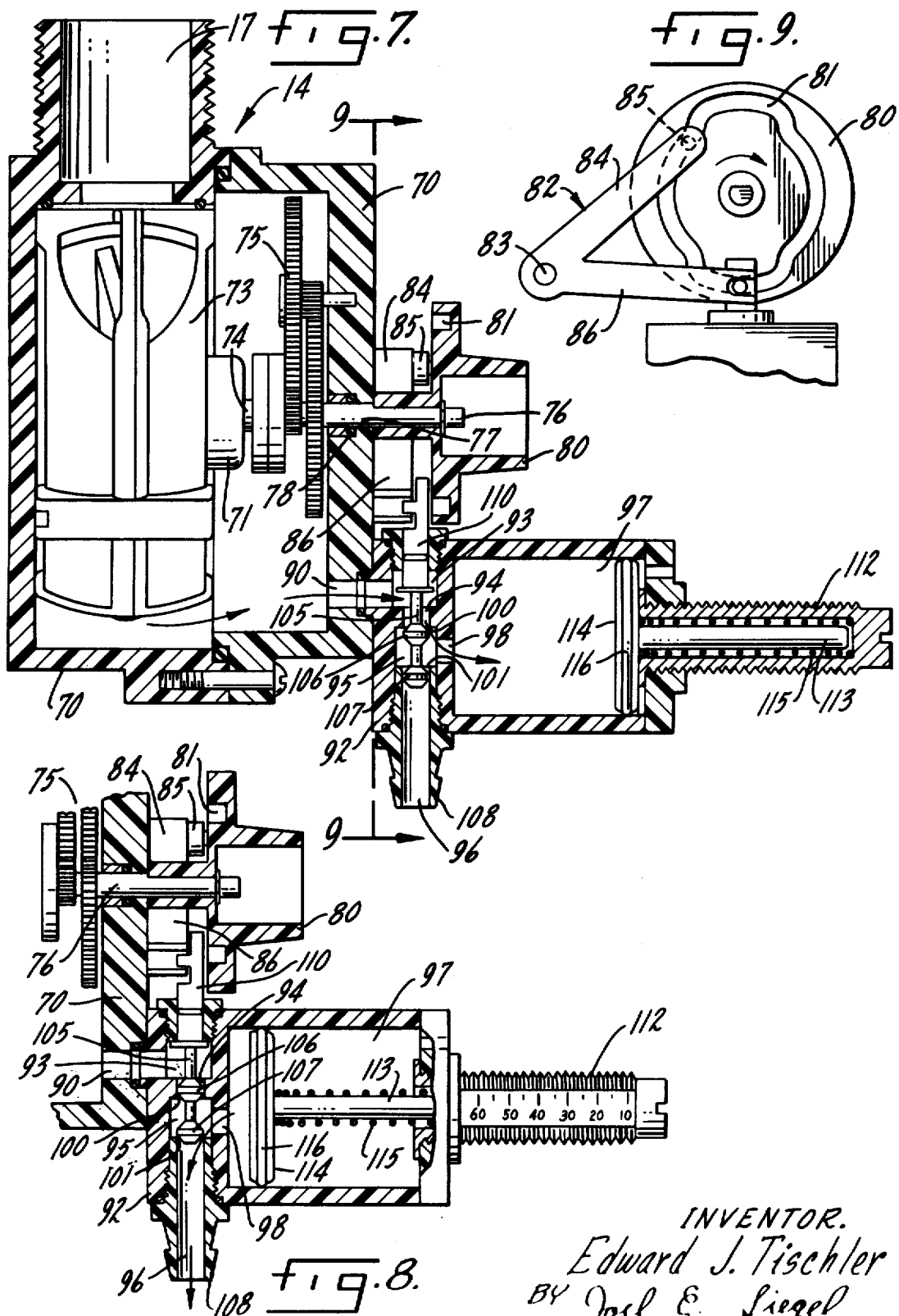

WATER SOFTENER SYSTEM

BACKGROUND OF THE INVENTION

The present invention relates to a novel control assembly for an automatic water softener having a brine storage tank to rejuvenate the water softening or conditioning material and, more particularly, to a brine saver device which will provide an optimum quantity of brine for regeneration or rejuvenation of the water softening material based upon the quantity of liquid passing through the softener during the water conditioning cycle.

The precise amount of brine which will be required to completely regenerate a bed of ion exchange material of predetermined volume, is dependent upon the extent to which the bed is exhausted by the softening process. This, in turn, depends upon a number of factors, including: (1) the extent of hardness of the water being treated; (2) and the amount of water treated during a service cycle. To enhance the economy of the system, it is desirable to precisely limit the amount of salt utilized in each regeneration cycle and the frequency of each regeneration cycle to the amount required.

For any given water softener installation the capacity of the bed of ion exchange material is known and the average hardness of the water used at that installation is also known. The average amount of water used at any given installation can readily be calculated. From these facts the frequency with which the bed of ion exchange material must be regenerated to ensure a constant supply of soft water can readily be calculated. Depending upon the capacity and volume of ion exchange material, the hardness of the water, and water consumption, the frequency with which the ion exchange material must be regenerated may vary widely from every day or two up to once every 2 weeks or so.

Most water softener installations are designed to regenerate on a predetermined timed cycle determined by taking into consideration the above-mentioned factors. Because of this if a home owner is away for a 2 week vacation, his water softening system will regenerate itself during the regeneration cycle in spite of the fact that no water has been used. Since no hard water has passed through the system and regeneration is not therefore necessary, the brine and power required to carry out the useless regeneration cycle is wasted.

It is known in the prior art to provide a metering valve by which the water used to prepare a saturated brine solution for passage through the bed of ion exchange water softening material during the regeneration cycle is metered into a brine generating tank in fixed predetermined proportion to the amount of water consumed, whereby regeneration is dependent upon the amount of water consumed. In these devices a float means is provided in the brine storage tank such that when a predetermined level is reached in the brine storage tank the regeneration cycle is started. The prior art devices do not provide accurate means to adjust the proportion of water metered into the brine tank dependent upon the hardness of the water being softened. As mentioned above the exhaustion of softening material is directly related to the hardness of the water being softened. Thus prior art devices may regenerate too frequently and thus waste brine or not often enough and thus not produce soft water. The present invention provides a unique metering device which includes means to adjust the volume of water passing therethrough dependent upon the hardness of the water being softened. The present invention also provides a unique means of initiating regeneration when the volume of the water in the brine storage tank reaches a predetermined level that is less subject to failure due to the lack of moving elements in the brine solution.

The withdrawal of regenerant is usually at sub-atmospheric pressure under control of a float actuated valve. The valve conventionally includes a buoyant valve member associated with a valve seat positioned at the low level of the brine tank. During the regeneration cycle the regenerant is removed from the brine tank until the liquid level in the tank reaches the level of the valve seat, at which point the valve member contacts the valve seat and closes off flow of regenerant. When water flows back through the suction tube the valve member is released from the valve seat. Prior art valves frequently stick on closing due to lodging of solid particles of salt and sediment from the brine and water on the valve seat and valve member with the result that the valve fails to open. The present invention provides a unique float actuated valve which includes means to prevent the valve member from sticking in its closed position due to a suction lock.

SUMMARY OF THE INVENTION

It is the principal object of this invention to provide a metering device by which the water used to prepare a saturated brine solution to regenerate an ion exchange water softening material is metered into a brine generating tank in fixed predetermined proportion to the amount of water softened, whereby regeneration is dependent upon the amount of water softened.

It is another object to provide a metering device as set forth above which includes means to adjust the proportion of water metered into the brine tank dependent upon the hardness of the water being softened.

Another object of the present invention is to provide means to signal when the water in the brine storage tank has reached a predetermined level, such means being immune to frequent failure because of the lack of moving elements positioned in the brine solution.

A still further object of the present invention is to provide a float valve which includes means associated therewith to prevent sticking of the valve member to the valve seat.

Another object is to provide a water softener of the fully or semi-automatic type which is suitable for either domestic or commercial use and which is more simple in construction and operation, more inexpensive to manufacture, and more economical, efficient, and dependable in operation than similar softeners heretofore provided.

The foregoing and other objects are realized in accord with the present invention by providing a metering device associated with the soft water line to meter a predetermined proportion of water from the soft water line. This water is directed to a chamber having an adjustable water storage capacity. The proportion of water metered from the soft water line is directly proportional to the storage capacity of a pump chamber. The water stored in the chamber is periodically directed to the brine storage tank. The brine storage tank includes an enclosure having vertically extending slots therein, spaced from the top of the enclosure, in fluid communication with the brine. As the water level in the tank reaches the top of the slots air is trapped in an upper portion of the enclosure. This air is force upward through a conduit to activate a timer to signal the need for regeneration. Also, positioned within the brine tank is a float valve which prevents brine from being withdrawn below a predetermined low level in the tank. The float valve includes a buoyant ball valve and a valve and a valve seat positioned at the elevation of the low level. Means are provided to prevent the ball valve from sticking to the valve seat after the regeneration cycle.

Other objects and features of the invention will become apparent to those skilled in the art as the disclosure is made in the following description of a preferred embodiment of the invention, as illustrated in the accompanying sheets of drawing, in which:

DESCRIPTION OF THE DRAWINGS

FIG. 3 is a partial vertical section view of the brine storage tank illustrating the details of the float valve;

FIG. 4 is an enlarged elevational view of the valve stem in the float valve illustrated in FIG. 3;

FIG. 5 is a bottom plan view of the valve stem illustrated in FIG. 4;

FIG. 6 is a vertical section view of the drive means of the soft water metering device showing the inlet and outlet ports;

FIG. 7 is a vertical section taken along line 7—7 of FIG. 6 showing the valves in position to permit water to enter the regulating chamber in the manner as shown by the arrows;

FIG. 8 is a partial vertical section similar to FIG. 7 showing the valves in position to permit water to flow from the regulating chamber to the brine storage tank in the manner shown by the arrows; and FIG. 9 is a partial view taken along line 9—9 of FIG. 7 illustrating the cam which controls the position of the valves.

DESCRIPTION OF THE PREFERRED EMBODIMENT

Figure 1:
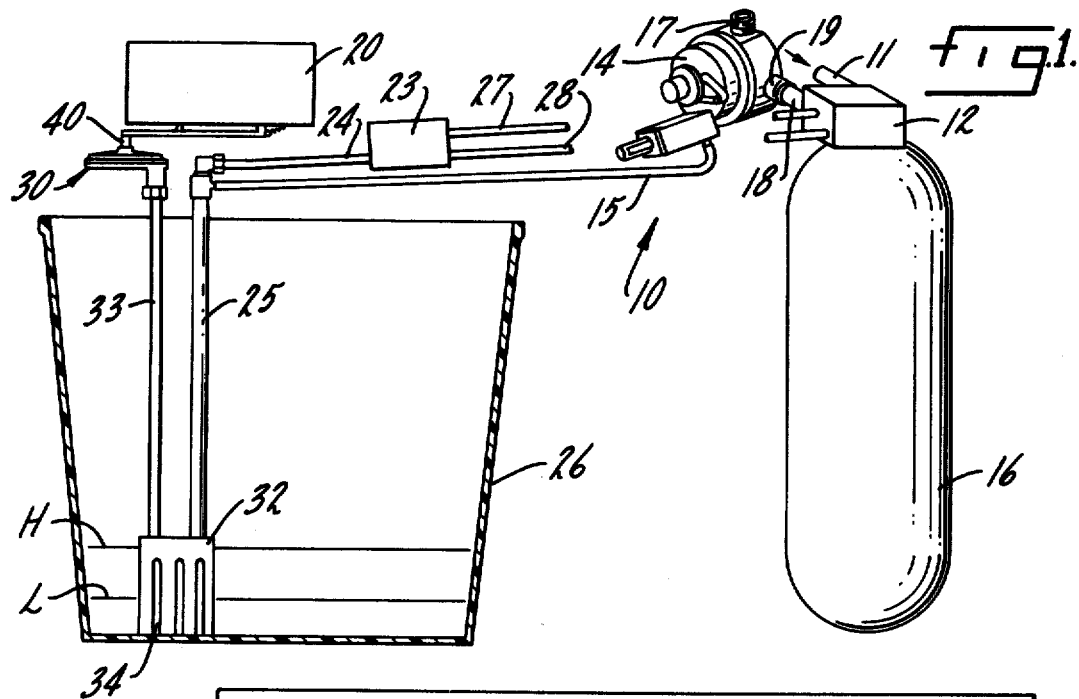
FIG. 1 is a view, part in perspective, part in elevation, and part in schematic, of an automatic water softening system embodying the soft water metering device of the present invention.

Referring to FIG. 1, a water softening system is broadly illustrated at 10. The system 10 is designed to soften city main water when it is delivered to a residence during a service cycle of the system. Periodically the system 10 is regenerated by the use of a brine solution in a regeneration cycle. During the service cycle hard water from a suitable source is passed through an inlet feed line 11 to control valve 12, of the type disclosed in U.S. Pat. No. 3,335,752, assigned to the assignee of the present invention. Control valve 12 directs the raw water to a resin tank 16 which contains a bed of ion exchange particles. The raw water passes through the bed of particles and is withdrawn from the tank through control valve 12 to soft water outlet line 18.

A metering device 14, attached to soft water outlet 18, meters out a predetermined proportion of the soft water passing through outlet 18 and directs it to brine tank 26 via conduits 15 and 25. The remainder of the soft water is directed through service outlet 17 to suitable piping for use in the home. After the level of water, from metering device 14, in brine tank 26 reaches a predetermined level, as indicated at H in FIG. 1, timer 20 is activated so as to permit regeneration. This regeneration conventionally includes cycles wherein the ion exchange particle bed is backwashed and rinsed. It further includes a cycle wherein the ion exchange particle bed is regenerated by a brine solution. The regeneration cycle is initiated by the timer 20 activating control valve 12 which draws brine from brine tank 26 through return line 24 into aspirator 23. The concentrated brine solution is drawn up through the brine line 24 from the brine tank 26 by a suction created by passing hard water from control valve 12 into aspirator 23 via line 27 and out of aspirator 23 via line 28 so as to establish a pressure reduction by Venturi effect in brine line 24. The brine flows from aspirator 23 into control valve 12 via line 28. An example of such an aspirator assembly is illustrated in U.S. Pat. No. 3,146,726, assigned to the same assignee as the present invention.

Figure 2:
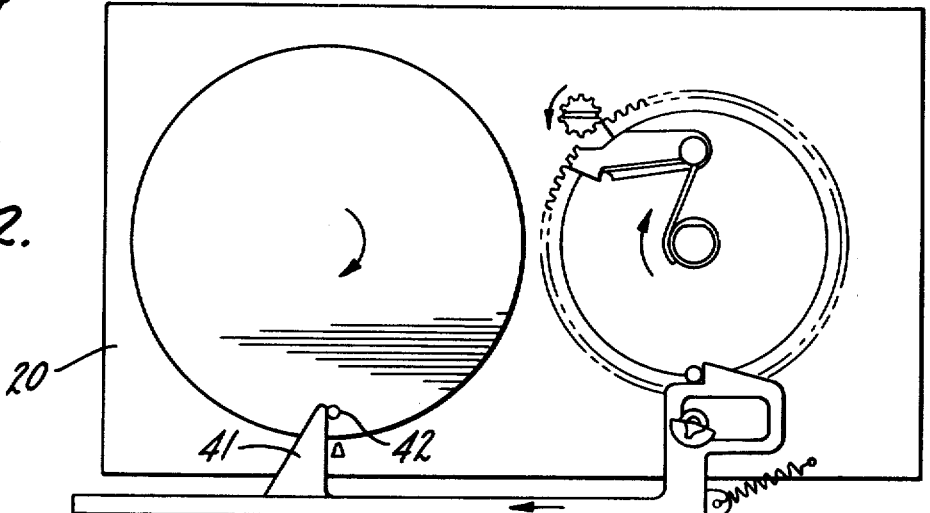
FIG. 2 is a vertical section view of the timer actuating means showing details of the diaphragm and actuating member associated therewith in conjunction with a timer.

FIG. 2 shows timer 20 in conjunction with timer activating means 30. As seen in FIG. 3 brine tank 26 includes an enclosure 32 positioned on the bottom of tank 26. Enclosure 32 has a plurality of upwardly extending vertical slots 34 therein so as to permit fluid communication between enclosure 32 and brine tank 26. Slots 34 extend upward from the bottom of enclosure 32 to above the low liquid level, indicated at L in FIG. 3, and terminate below the high liquid level, indicated at H in FIG. 3. Conduit 33 in fluid communication with, and extending from the top of, enclosure 32 is attached to activating means 30 positioned adjacent timer 20. Activating means 30 includes a body 35 having a cavity 36 therein in fluid communication with conduit 33, and hence in communication with air space 39 in the top of enclosure 32. Positioned within cavity 36 is a flexible diaphragm 38 having an activating arm 40 attached thereto positioned so as to translate movement of diaphragm 38 to timer 20.

In operation, as the liquid level in brine tank 26 rises above the top of slots 34 air trapped in air space 39 of enclosure 32 is forced up conduit 33 so as to exert an upward force on diaphragm 38. This upward force pushes diaphragm 38 and activating arm 40 attached thereto upward a sufficient distance into a timer activating position, as seen in FIG. 2, wherein a flange 41, attached to arm 40, contacts pin 42, associated with timer 20. Timer 20 upon activation signals control valve 12 to initiate regeneration at the next convenient time of day. As brine is removed from brine tank 26 the force is thereby removed from diaphragm 38 and activating arm 40 returns to a neutral position wherein activating arm 40 does not activate timer 20. By varying the length of conduit 33 and the height of slots 34 the liquid level at which timer 20 will be activated may be varied.

Timer 20 is of the type which may be set to initiate the regeneration cycle at some convenient hour, such as, for example 3:00 a.m. The timer is inoperative to initiate the regeneration cycle except when a predetermined volume of brine is present in the brine tank and, therefore, activating arm 40 is in its timer activating position. Timers of this type are well known to the art and adaptation of timer actuating means 30 to such timers would require only skill possessed by one skilled in the art.

Also positioned within enclosure 32 is float valve 50, as seen in FIG. 3, to control the removal of brine from brine tank 26. Conduit 25, positioned within brine tank 26, has one end extending into enclosure 32 terminating at approximately the level of the upper portions of slots 34 and the other end in fluid communication with conduit 15. Positioned concentrically within conduit 25 is brine line 24 which at one end communicates with aspirator 23 and at the other end communicates with float valve 50.

Float valve 50 includes a body 52 having a chamber 54 therein. Chamber 54 has a vertically extending slot 56 therein to permit fluid communication between chamber 54 and enclosure 32. Buoyant ball valve 57 in chamber 54 moves up and down as the liquid level in enclosure 32 moves up and down. Chamber 54 has an aperture 51 at the bottom portion thereof which defines a first valve seat 58. In fluid communication with valve seat 58 are passageway 59, chamber 60, and passageway 61. Passageway 61 extends between the lower end of brine line 24 and chamber 60. Chamber 60 has an aperture 62 at its upper end and an aperture 63 at its lower end. Valve stem 65 is positioned within chamber 60. Valve stem 65, as seen in FIGS. 3-5, includes a horizontal disk portion 66 and a pair of vertically extending rods 67 and 68 extending from the top and bottom respectively. The bottom portion of disk 66 has a plurality of grooves 69 therein. The disk portion 66 of valve stem 65 is positioned within chamber 60 and rods 67 and 68 extend through and are spaced from the inner periphery of apertures 62 and 63 respectively.

In operation, during the service cycle soft water from metering device 14 passes through conduit 15 into conduit 25 to enclosure 32 and out through slots 34 into brine tank 26. During the service cycle ball valve 57 and valve stem 65 are positioned as shown in FIG. 3. Ball valve 57 is in its first position above seat 58 and valve stem 65 is in its first position wherein the upper portion of rod 67 extends through aperture 51 to ensure that ball 57 is unseated, and not stuck to valve seat 58, and the upper surface of disk portion 66 closes off aperture 62 which prevents water from entering brine tank 26 and prevents brine from entering passageway 59 and air from entering chamber 54. During the brine cycle a suction is created in line 24 drawing valve stem 65 from its first position to its second position (not illustrated) wherein the bottom portion of disk 66 contacts the bottom surface of chamber 60 and the upper portion of rod 67 is removed from aperture 51. When in this position brine flows from brine tank 26 through slots 34 into enclosure 32; through slot 56 into chamber 54; through aperture 51 into passageway 59; through aperture 62 into chamber 60; through grooves 69 and aperture 63 into passageway 61; and up brine line 24 into control valve 12 via aspirator 23. Brine is continuously withdrawn until ball 57 comes to rest on valve seat 58 thus closing off fluid communication between chamber 54 and passageway 59 and preventing air from getting into passageway 59, chamber 60 and tank 26. Valve seat 58 is positioned at low level L, as seen in FIG. 3, thereby preventing the level in brine tank 26 from going below said low level. Upon completion of the brine cycle when positive pressure is restored in line 24, liquid from aspirator 23 flows down line 24 through passageway 61 and exerts an upward force on the bottom of disk 66 moving valve stem 65 from its second position to its first position. As mentioned above when in this position ball 57 is forced off of valve seat 58 by the upper portion of rod 67 and fluid communication between chamber 60 and passageway 59 is closed thus preventing liquid from passing in either direction through aperture 62. Valve stem 65 may alternatively be of a buoyant material such that valve stem 65 will assume its first position when liquid enters chamber 60 during the service cycle.

Referring to FIGS. 6-9 metering device 14 will now be disclosed in detail. Metering device 14 includes a housing 70 having an inlet 19 and an outlet 17. Adjacent inlet 19 and outlet 17 is water meter 73 which nutates proportional to the rate of liquid flow through inlet 19 and outlet 17. Shaft 74, attached at one end to the inner hub 71 of water meter 73 and at its other end to a reduction gear train 75, rotates about a horizontal axis at the same r.p.m. as water meter 73. Shaft 76, attached to gear train 75, rotates about a horizontal axis at an r.p.m. significantly less than shaft 74. The above-mentioned portion of metering device 14 constitutes the drive means which measures the rate of flow of soft water passing through meter 73 and proportionally translates this rate to shaft 76.

Shaft 76 extends through housing 70 at 77 where an O-ring 78 is provided to prevent water from leaking out of housing 70. Attached to shaft 76 is a cam member 80 which rotates at the same r.p.m. as shaft 76. Cam 80 includes a grooved cam surface 81, as seen best in FIG. 9. V-shaped cam follower member 82, having arms 84 and 86, is pivotally attached to housing 70 by a horizontal pin passing through aperture 83 into housing 70. Arm 84 of follower 82 has a follower pin 85 which rides in cam surface 81. As cam 80 rotates pin 85 follows cam surface 81 and cam follower 82 pivots at 83 so as to result in an up and down oscillating stroke of arm 86. The number of strokes per minute is directly proportional to the r.p.m. of shaft 76 and, therefore, directly proportional to the rate of fluid flow through inlet 19.

A metering orifice 90 is provided through housing 70 to permit a small portion of the water entering housing 70 to pass therethrough. Attached to housing 70 is a second housing 92 which includes passageways 93, 94, 95 and 96 and regulating chamber 97. As best seen in FIG. 7, orifice 90 is in fluid communication with passageway 93; passageway 93 is in fluid communication with passageway 94; passageway 94 is in fluid communication with passageway 95; and passageway 95 is in fluid communication with passageway 96. First valve seat means 100 is positioned between passageways 94 and 95 and second valve seat means 101 is positioned between passageways 95 and 96. Chamber 97 is in fluid communication with passageway 95 through orifice 98.

Positioned within passageways 93–95 is valve stem 105 having valve closure members 106 and 107 attached thereto positioned in passageway 95. Valve member 106 has a closed position in contact with valve seat 100 preventing fluid flow therethrough and an open position spaced from valve seat 100 permitting fluid flow between passageways 94 and 95. Valve member 107 has a closed position in contact with valve seat 101 preventing fluid flow therethrough and an open position spaced from valve seat 101 permitting fluid flow between passageways 95 and 96. When valve member 106 is in its closed position valve member 107 is in its open position and when valve member 106 is in its open position valve member 107 is in its closed position. Extension arm 110 is attached to valve stem 105 at one end and at its opposite end to arm 86 of cam follower 82. The up and down oscillatory stroke of arm 86 is thereby transmitted through arm 110 to valve stem 105 thereby moving valve members 106 and 107 between their respective open and closed positions at a rate proportional to the rate of fluid flow through metering device 14.

Cylindrical regulating chamber 97 is in fluid communication with passageway 95 through orifice 98 passing through a first end of chamber 97. A second end of chamber 97 opposite said first end, has a threaded adjustment member 112 threadably received therethrough. Telescopically received within member 113 is tubular member 113 having a cylindrical disk 114 attached to one end thereof. Member 113 and disk 114 attached thereto have a first position wherein disk 114 is adjacent the second end of chamber 97, as seen in FIG. 7, and a second position wherein disk 114 is adjacent the first end of chamber 97, as shown in FIG. 8. Spring means 115 associated with member 113 biases member 113 and disk 114 towards their second position. O-ring 116 positioned about disk 114 prevents fluid communication between the portion of chamber 97 on one side of disk 114 and the portion of chamber 97 on the other side of disk 114. By rotation of member 112 the distance between disk 114 and the second end of chamber 97 when disk 114 is in its first position may be adjusted thereby adjusting the volume of liquid that may be accumulated in chamber 97 between disk 114 and the first end of chamber 97.

In operation inlet 19 of metering device 14 is attached to soft water outlet 18 and conduit 15 is attached to passageway 96 through connector 108. As soft water enters inlet 19, water meter 73 is rotated at a speed proportional to the rate and/or volume of flow of the soft water. Water meter 73 causes rotation of shaft 74, gear train 75, shaft 76 and cam 80. The rotation of cam 81 moves valve members 106 and 107 between their closed and open positions due to the up and down oscillatory movement of member 110 attached to cam follower 82. As seen in FIG. 7, when valve member 106 is in its closed position and, therefore, valve member 107 is in its open position the flow of the metered portion of the soft water, as shown by the arrows, flows from orifice 90 through passageway 93, through passageway 94, through valve seat 100 into passageway 95, and finally through orifice 98 into chamber 97. The pressure of the water passing through orifice 98 creates a force sufficient to move disk 114 from its second position towards its first position against the bias of spring 115. As cam 80 continues to rotate valve member 106 is moved into its open position and valve member 107 is moved into its closed position, as shown in FIG. 8. Water can no longer enter passageway 95 through valve seat 100 and, therefore, the force retaining disk 114 in its first position is removed and spring 115 causes disk 114 to return to its second position thus pumping the water accumulated in chamber 97 through passageway 95, valve seat 101, passageway 96, and through conduit 15 into brine tank 26, as shown by the arrows in FIG. 8.

The above-mentioned cycle is continuously repeated at a frequency proportional to the rate of soft water flow through metering device 14. By adjusting member 112 and thereby adjusting the water holding capacity of chamber 97 the amount of water metered out for distribution to brine tank 26 per cycle may be adjusted. As seen in FIG. 8, member 112 is calibrated such that depending on the hardness of the water being treated the quantity of the water metered to the brine tank may be periodically changed.

During periods of high water consumption, the level of the brine solution in brine tank 26 will rise relatively rapidly and each day that the brine level reaches the predetermined level indicated at H, timer activating means 30 will permit timer 20 to initiate regeneration at the next convenient time selected. On the other hand, each day when at the selected time the brine level is below the predetermined level, the regeneration cycle will be skipped for that 24-hour period.

It will be seen that the present invention provides an automatic water softening system which includes means to accurately meter out a predetermined proportion of the water passing through the soft water outlet line, which proportion may be readily adjusted dependent upon the hardness of the water being treated; means to activate the timer when a predetermined high level is reached in the brine tank which does not have any moving parts in contact with the brine; and float valve means to stop flow of brine from the brine tank when a predetermined low level is sticking in its closed position.

It should be understood, of course, that the foregoing relates to only a preferred embodiment of the invention and that numerous modifications or alterations may be made therein without departing from the spirit and the scope of the invention as set forth in the appended claims.

What is claimed is:

1. In an automatic water softening system comprising a tank of water softening mineral adapted to be connected to a hard water flow line, a soft water distribution line from said tank of water softening mineral and a regeneration tank in communication with said tank of water softening material adapted to contain material for generation of regenerant for intermittent regeneration of said mineral, the improvement which consists in meter means for metering a predetermined proportion of water from a soft water flow line of said system into a regeneration tank, said meter means including:

a. a first valve means in fluid communication with said soft water line such that the volume of water passing therethrough is proportional to the volume of water passing through said soft water line, said first valve means having an open position permitting fluid flow therethrough and a closed position preventing fluid flow therethrough;

b. chamber means in fluid communication with said first valve means so as to collect the water passing through said first valve means;
c. second valve means in fluid communication with said chamber means, said second valve means having an open position permitting fluid flow therethrough and a closed position preventing fluid flow therethrough;
d. said first valve means cooperating with said second valve means such that when said first valve means is in its open position said second valve means is in its closed position and when said first valve means is in its closed position said second valve means is in its open position;
e. means associated with said chamber means to force water collected in said chamber means through said second valve means when said second valve means is in its open position;
f. passage means associated with said second valve means to direct water passing through said second valve means to said regeneration tank;
g. drive means positioned in communication with the soft water line having a shaft associated therewith such that said shaft rotates at a rate proportional to the volume of water passing through said soft water line;
h. cam means rotatable by said shaft; and
i. cam follower means associated at one end with said cam means and at the other end with said first valve means such that rotation of said cam means transmits an oscillatory motion to said cam follower means thereby moving said first valve means between its first and second position.

2. In the combination defined in claim 1 wherein said means associated with said chamber means being adjustable to limit the volume of water that may enter said chamber means.

3. In the combination defined in claim 1 wherein said first and second valve means being associated with a first end of said chamber means and said means being associated with a second end of said chamber means, said means including a disk member in fluid sealing engagement with the side walls of said chamber means having a first position wherein said disk being adjacent said second end of said chamber means and a second position wherein said disk member being adjacent said first end of said chamber means, said disk being biased towards its second position such that the pressure of the water entering said chamber means when said first valve means is in its open position moves said disk member from its first position towards its second position and when said second valve means is in its open position said bias moves said disk member from its second position towards its first position forcing the water contained in said chamber means through said second valve means.

4. In the combination defined in claim 3 wherein additional means being provided to adjust the distance said disk member is spaced from said second end of said chamber means when said disk member is in its second position thereby permitting adjustment of the water holding capacity of said chamber means.

5. In an automatic water softening system, apparatus comprising:
a. a softening tank for containing water softening material;
b. a regeneration tank for containing a body of water soluable regenerating material for which when dissolved in water forms a regenerating solution for such water softening material;
c. a soft water distribution line from said softening tank to service;
d. means for directing water into said regeneration tank;
e. timer means which upon activation initiates delivery of said regenerating solution to said softening tank; and
f. activating means for activating said timer means when said regenerating solution reaches a predetermined level in said regeneration tank;
g. said activating means comprising an enclosure positioned within said regeneration tank, a conduit having one end in fluid communication with said enclosure and the other end in fluid communication with a cavity having a diaphragm therein, arm means associated with said diaphragm to translate motion of said diaphragm to said timer having a timer activating position and a neutral position, and said enclosure having apertures therein below said predetermined level in fluid communication with said regeneration solution such that as said regenerating solution reaches said predetermined level air trapped in said enclosure above said aperture is forced up said conduit so as to exert a force on said diaphragm moving said arm means from said neutral position to said timer activating position.

6. In a float valve of the type adapted to be submerged in a liquid in a container, said valve having a closed position preventing flow of said liquid therethrough and an open position permitting flow of said liquid therethrough, said valve comprising:
a. a valve body;
b. a chamber positioned within said body having apertures therein in fluid communication with said liquid in said container;
c. a passageway in fluid communication with the lower end of said chamber;
d. a first seat means positioned adjacent the lower end of said chamber in fluid communication with said passageway;
e. a second seat means positioned below said first seat means within said passageway;
f. a float ball positioned within said chamber having a first position above said first seat means and a second position adjacent said first seat means closing off fluid communication between said container and said passageway; and
g. valve system means having a first position wherein said valve system means closes off fluid flow through said second seat means and extends through said first seat means to force said float ball off said first seat means and a second position wherein said valve system means is spaced from said second seat means permitting fluid flow therethrough.

7. In an automatic water softening system having a tank for containing water softening material, a regeneration tank for containing a body of water soluable regenerating material for which when dissolved in water forms a regenerating solution, and a timer means which upon activation initiates delivery of said regenerating solution to said tank; the improvement comprising:

a. meter means for metering a predetermined proportion of water from a soft water flow line into said regeneration tank, comprising:
1. a first valve means in fluid communication with said soft water line such that the volume of water passing therethrough is proportional to the volume of water passing through said soft water line, said first valve means having an open position permitting fluid flow therethrough and a closed position preventing fluid flow therethrough;
2. chamber means in fluid communication with said first valve means so as to collect the water passing through said first valve means;
3. second valve means in fluid communication with said chamber means, said second valve means on open position permitting fluid flow therethrough and a closed position preventing fluid flow therethrough.
4. said first valve means cooperating with said second valve means such that when said first valve means is in its open position said second valve means is in its closed position and when said first valve means is in its closed position said second valve means is in its open position;
5. means associated with said chamber means to force water collected in said chamber means through said second valve means when said second valve means is in its open position; and
6. passage means associated with said second valve means to direct water passing through said second valve means to said regeneration tank;

b. activating means for activating said timer means when said regenerating solution reaches a predetermined high level in said regeneration tank comprising:
1. an enclosure positioned within said regeneration tank;
2. a conduit having one end in fluid communication with said enclosure and the other end in fluid communication with a cavity having a diaphragm therein;
3. lever means associated with said diaphragm to translate motion of said diaphragm to said timer having a time activating position and a neutral position; and
4. said enclosure having apertures therein below said predetermined level in fluid communication with said regenerating solution such that as said regenerating solution reaches said predetermined level air trapped in said enclosure above said apertures is forced up said conduit so as to exert a force on said diaphragm moving said lever means from said neutral position to said timer activating position;

c. float valve means positioned within said regeneration tank to control the removal of said regenerating solution, comprising:
1. a valve body;
2. a chamber positioned within said body having apertures therein in fluid communication with said regenerating solution;
3. a passageway in fluid communication with the lower end of said chamber;
4. a first seat means, positioned at a predetermine low level of said regenerating tank, adjacent the lower end of said chamber in fluid communication with said passageway;
5. a second seat means positioned below said first seat means within said passageway;
6. a float ball positioned within said chamber having a first position above said first seat means and a second position adjacent said first seat means closing off fluid communication between said container and said passageway; and
7. valve stem means having a first position wherein said valve stem means closes off fluid flow through said second seat means and extends through said first seat means to force said float ball off said first seat means and a second position wherein said valve stem means is spaced from said second seat means permitting fluid flow therethrough;
8. said second seat means being in fluid communication with a conduit which directs regenerating solution from said regenerating tank to said tank containing water softening material.

* * * * *